United States Patent [19]
Ikeda

[11] Patent Number: 5,195,697
[45] Date of Patent: Mar. 23, 1993

[54] APPARATUS FOR PREVENTING TAPE SAG DURING MODE CHANGING IN A VIDEO RECORDER

[75] Inventor: Yoshiaki Ikeda, Suweon, Rep. of Korea

[73] Assignee: Samsung Electronics Co., Ltd., Suwon, Rep. of Korea

[21] Appl. No.: 639,332

[22] Filed: Jan. 10, 1991

[30] Foreign Application Priority Data

Aug. 30, 1990 [KR] Rep. of Korea .................. 90-13430

[51] Int. Cl.$^5$ ..................... G11B 15/43; G11B 15/48
[52] U.S. Cl. ................................. 242/204; 360/74.1
[58] Field of Search ............. 242/200, 201, 202, 199, 242/193, 203, 204; 360/74.3, 132, 74.1

[56] References Cited

U.S. PATENT DOCUMENTS 3,501,111 3/1970 Procop ................................. 242/202
4,814,912 3/1989 Kleinlein et al. ............... 242/200 X

FOREIGN PATENT DOCUMENTS 2750072 5/1979 Fed. Rep. of Germany ...... 242/201
2935513 3/1980 Fed. Rep. of Germany ...... 242/201
0292765 12/1990 Japan ................................. 360/74.3
2139802 11/1984 United Kingdom ............... 360/74.3

Primary Examiner—Daniel P. Stodola
Assistant Examiner—John F. Rollins
Attorney, Agent, or Firm—Robert E. Bushnell

[57] ABSTRACT

A tape sag preventing apparatus includes a master cam, a main slide device interlocking with a brake lever movable by the master cam, an idle gear for driving reel disks and converting rotating directions of the reel disks and a tape sag preventing device for preventing the sag of the tape in converting the transporting direction of the tape according to the movement of the main slide device. The main slide device is provided with a cam slot formed on an end thereof to drive a tension pole. The tape sag preventing device has an operating lever biased by an elastic member and a driving gear which is rotated by the operating lever so as to tighten a spring around a transmission gear and thereby impart rotation to the supply reel so as to take up slack in the tape during a change in the direction of the tape transport.

13 Claims, 5 Drawing Sheets

APPARATUS FOR PREVENTING TAPE SAG DURING MODE CHANGING IN A VIDEO RECORDER

BACKGROUND OF THE INVENTION

The invention relates to a tape sage preventing apparatus for a tape playing machine such as a video tape recorder wherein the tape can be prevented from sagging during a reversal of the direction of tape transport.

In general, as shown in FIG. 1, a video tape recorder which can record and/or reproduce signals to and from a magnetic video tape 4 using a rotary head drum 2 transports the tape along a predetermined running path. In such a tape recorder, when, for example, the transport direction of the tape is changed from the forward direction to the reverse direction, a supply reel disk 3 rotates temporarily in the forward direction, and thereafter rotates in the reverse direction. At this time, the tape sags, i.e., loses tension, because the reel disk 3 continues to rotate due to its rotational inertia in the forward direction, arrow j, even though it is braked by a sub-brake 6.

For this reason, to prevent the aforementioned tape sag, when the direction of transport of the tape 4 is changed from forward direction to the reverse direction, a tension bar 5 (FIG. 2) moves from the position designated by the solid line to the alternative position indicated by the long and short dashed line, see FIG. 2, to absorb the tape sag. However, tape 13 still released in the initial forward direction during the change of transport direction because the tension applied to the tape in forward direction (the tension bar 5 being in the state indicated by the solid line) is larger than the brake force that the sub-brake 6 can generate. Furthermore, because an amount of the tape corresponding to one frame is added, the tension bar can not absorb all of the released tape, so that the tape sag still occurs.

The aforementioned tape sag means that the tension in the tape is lowered and that the contact force between the drum head and the tape is correspondingly decreased causing noise to appear on the TV screen.

An alternative method of preventing tape sag is to increase the baking force of the sub-brake. However, the torque is then reduced during the reverse search and the rewind functions, so it is different to apply such a method to the tape recorder.

SUMMARY OF THE INVENTION

It is an object of the present invention provide an apparatus for preventing a tape sag wherein the noise caused by the temporary tape sag may be removed by absorbing partly the tape sag on the tension pole and at the same time by rotating the reel disk in the winding direction by predetermined steps when the tape transporting direction is changed between the forward direction and the reverse direction.

In order to achieve the above object, there is provided an apparatus for preventing a tape sag of a tape recorder having a master cam operated by power from a loading motor and an idle gear for driving reel disks and converting rotating directions of the reel disks by a capstan motor, said apparatus comprising: a main slide device interlocking with a brake lever movable by the master cam for driving brakes to brake the reel disks; and means for preventing a tape release in changing a transporting direction of the tape according to movement of said main slide device.

BRIEF DESCRIPTION OF THE DRAWINGS

These and other objects, features and advantages of the present invention will become more apparent form the following description for the preferred embodiments taken in conjunction with the accompanying drawings, in which.

DETAILED DESCRIPTION OF THE PREFERRED EMBODIMENTS

The present invention, hereinafter, will be described in detail according to an embodiment with reference to the accompanying drawings.

Figure 1:
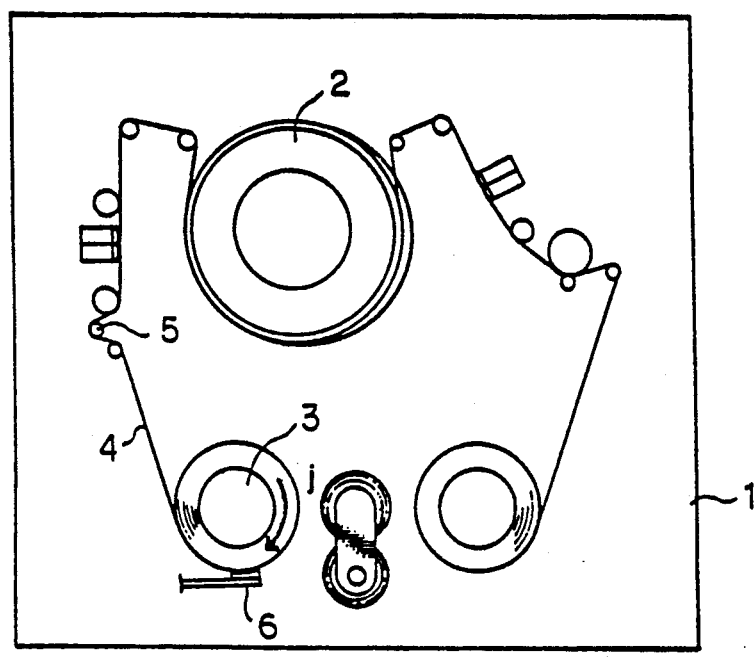
FIG. 1 is a schematic view showing the tape running path in a conventional tape recorder.
Figure 2:
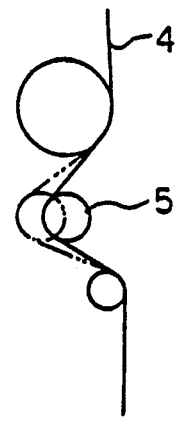
FIG. 2 is a view showing the operating states of the tension bar between the forward and reverse transport directions of a tape in the conventional tape recorder.

The video tape recorder of FIGS. 3 to 7 is of the same general type as that described above with reference to FIGS. 1 and 2, and only the differences will now be described.

Figure 3:
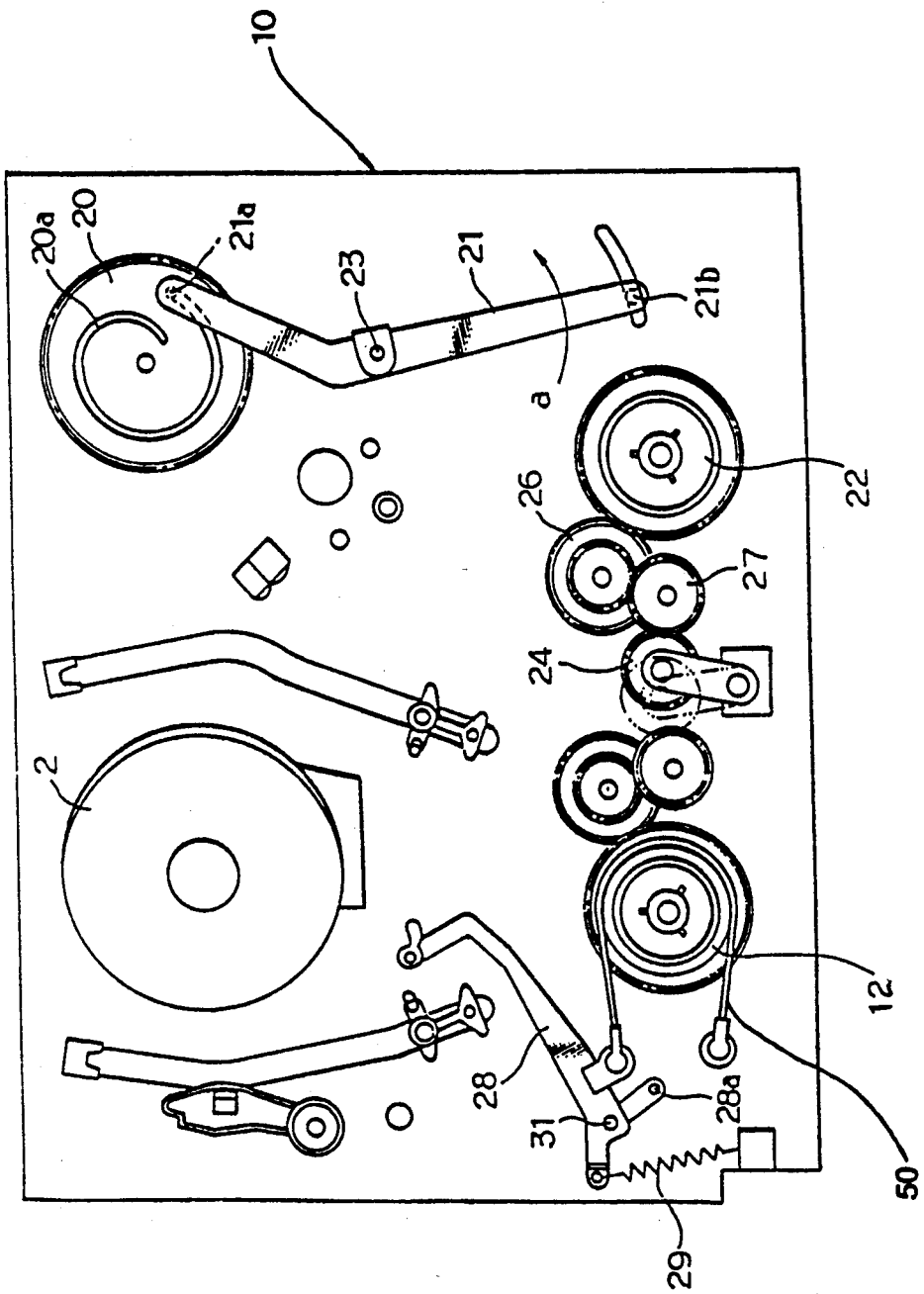
FIG. 3 is a schematic plan view showing a deck of a video tape recorder embodying the present invention.

FIGS. 3 to 7 in particular show apparatus for preventing tape sag. In FIG. 3, a cam groove 20a is formed on a master cam 20 rotated by power transmitted from a tape loading motor (not shown). A brake lever 21 is pivotably mounted on a shaft 23 on a deck 10 and is provided with cam follower pin 21a guided along the cam groove 20a. An operating pin 21b is provided at the other end of the brake lever 21 and is movably locked within a long slot 11a, FIG. 4(B), which is formed at one end of a main slide device 11 for operating brakes 50 to brake reel disk 12.

Guide holes 11b and 11c are formed on the main slide device 11 in respective longitudinal halves thereof. A fixed pin 30 and a boss 12a of the supply reel disk 12 are disposed in the holes 11b and 11c respectively to guide the main slide device 11 horizontally. Power transmission gears 26 and 27 are mounted on the deck 10 so that the power from a capstan motor 25 can be transmitted selectively to the reel disks 12 or 22 when the idle gear 24 is pivoted in the right or left direction. In additional, a cam slot 11d is formed at the end of the main slide device 11 opposite to that of the slot 11a for guiding as a cam follower an operating pin 28a of a tension pole 28 for adjusting the tension of the tape, as tension pole 5 of FIG. 1. A resilient member 9 in the form of a coil spring is provided at one side of the tension pole 28 to give a rotational bias about a fixed shaft 31.

Figure 5A:
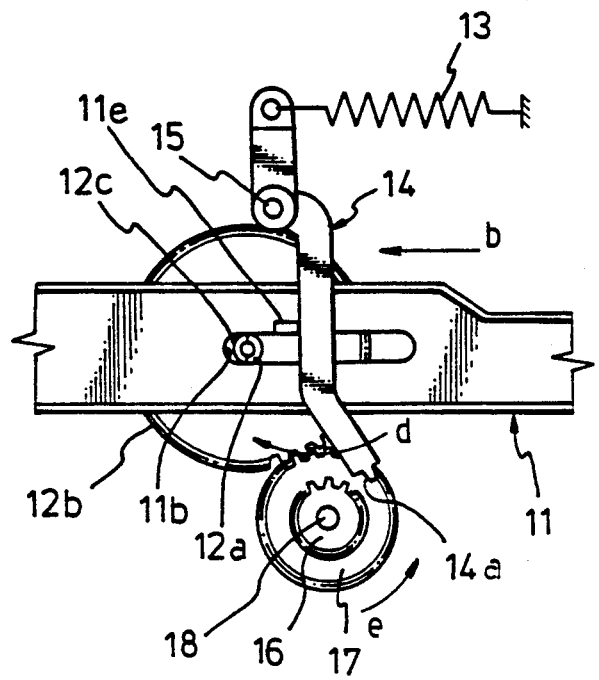
FIGS. 5(A) and 5(B) are views showing the operating states of a tape sag preventing apparatus incorporated in the tape recorder of FIG. 3.
Figure 5B:
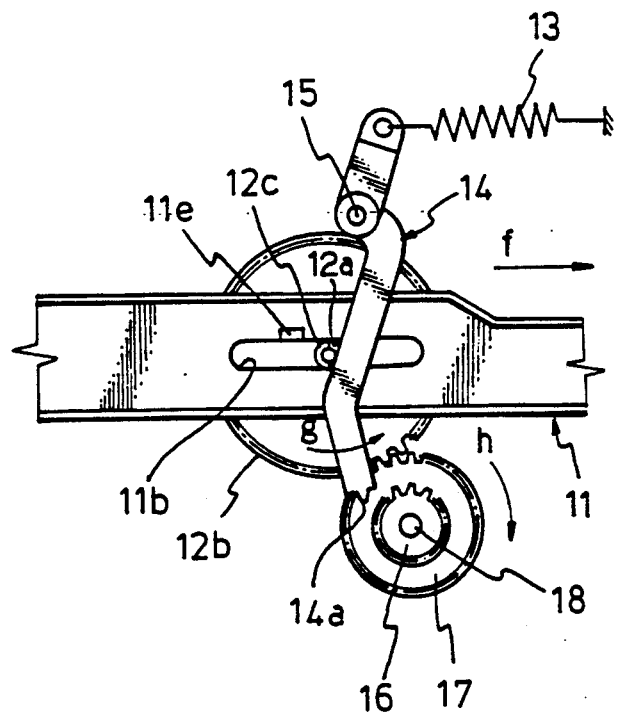
Figure 6A:
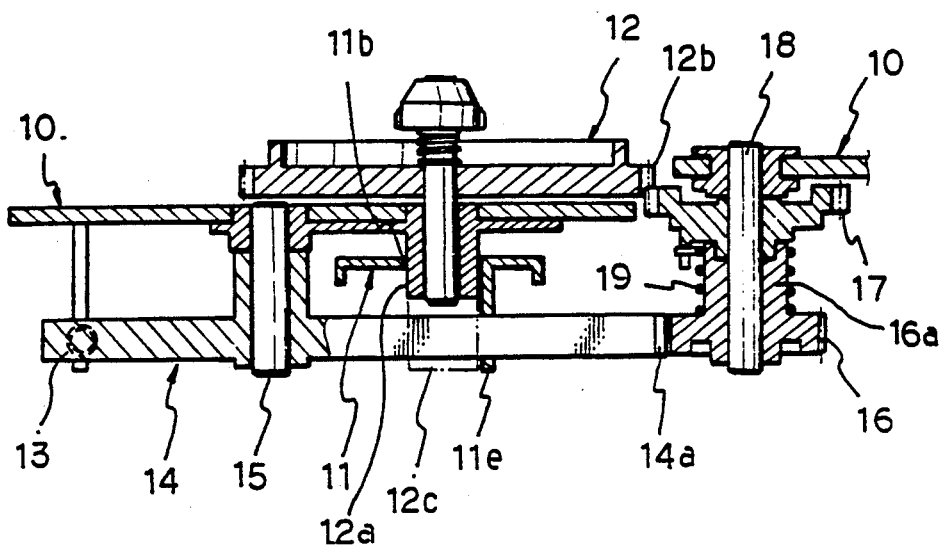
FIG. 6(A) is a sectional view of the tape sag preventing of FIGS. 5(A) and 5(B)
Figure 6B:
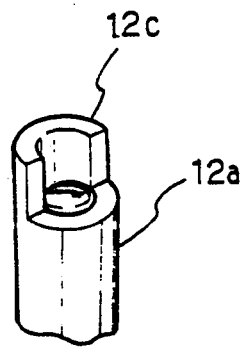
FIG. 6(B) is a partially perspective view showing part of the apparatus FIG. 6(A)

An integrally-formed latch lug 11e projects from one side face of the main slide device 11 at one longitudinal edge of the guide hole 11a through which the boss 12a of the supply reel deck 12 is passed. As shown in FIGS. 5(A), 5(B) and 6(A), an operating lever 14, connected to a resilient member 13 is in the form of a return spring, is pivotably mounted on a shaft 15 fixed to the deck 10. The operating lever 14 is biased into close contact with the latch lug 11e. An abutment projection 12c, FIG. 6B, defining one limit to the operating range of the operating lever 14 is formed integrally with the boss 12a of the supply read disk 12.

In addition, a tooth-shaped projection 14a is formed at one end of the operating lever 14 to mesh with and to rotate a driving gear 16 forwardly or in reverse. The driving gear 16 is mounted on the deck 10 and cooperates with a transmission gear 17. As shown in FIG. 6(A), the gear 16 and 17 are rotatably mounted on a fixed shaft 18, the transmission gear 17 meshing with a gear portion 12b of the supply reel disk 12. A release spring 19 is mounted over a boss 16a of the driving gear 16 between opposed forces of the driving gear 16 and the transmission gear 17. The inner end of release spring 19 is in intimate contact with the boss 16a of the driving gear 16 and the other end thereof is fixed to transmission gear 17. The release spring 19 provides a frictional rotary coupling between the driving gear 16 and the transmitting gear 17.

When the transport direction of the tape is changed from the forward direction to the reverse direction, the supply reel disk 12 continues to rotate temporarily in the forward direction and then rotates in the rewind or reverse direction. Therefore, some of the tape between the reels is released. At this time, the guide pin 21a is guided along the cam groove 20a of the master cam 20 by driving the loading motor (not shown) as shown in FIGS. 3 and 4, causing the brake lever 21 to rotate about its shaft 23 as indicated by arrow a. The main slide device 11 simultaneously slides to the left in FIG. 5(A) (as indicated by arrow b) toward the FIG. 5(B) position since the operating pin 21b of the brake lever 21 follows the long slot 11a. The guide holes 11b and 11c are guided by the boss 12a of the supply reel disk 12 and the pin 30 fixed to the deck 10, respectively, causing the main slide device 11 to translate in the horizontal direction.

Figure 4A:
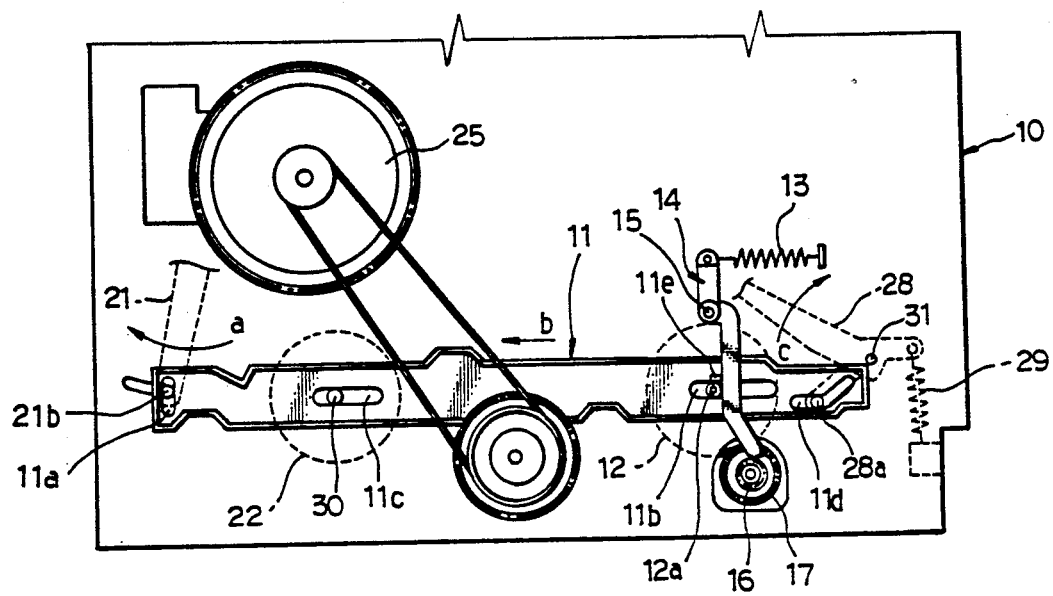
FIGS. 4(A) and 4(B) are underneath plan views of the deck of FIG. 3 illustrating the operating states of the tape recorder.
Figure 4B:
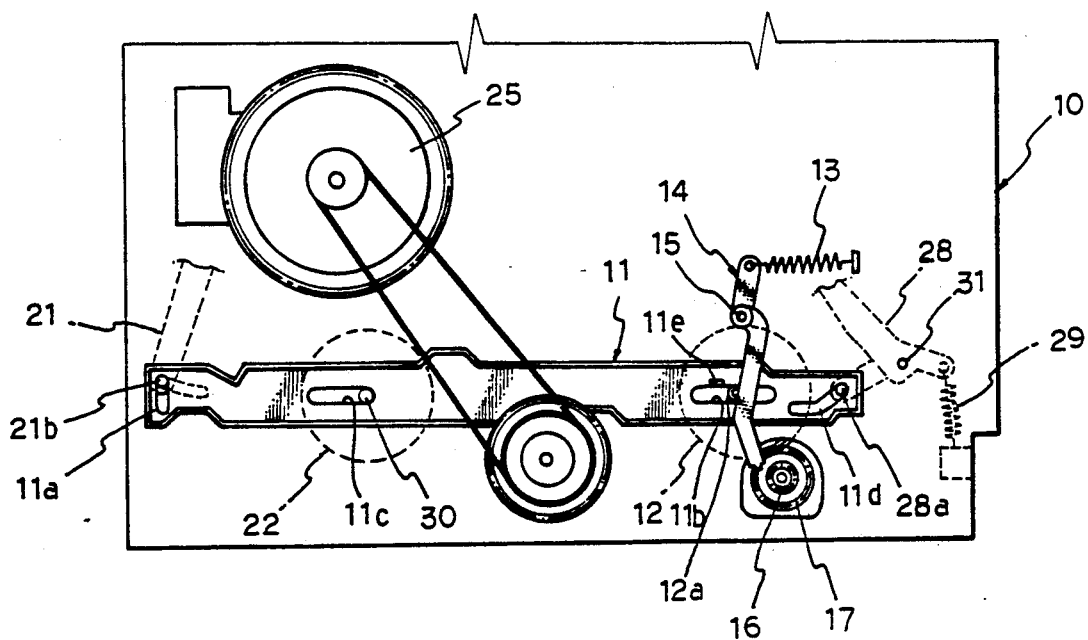
Figure 7:
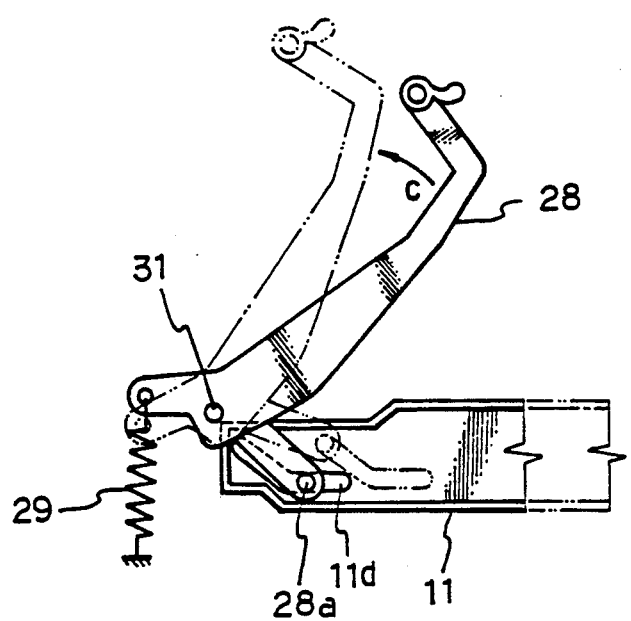
FIG. 7 is a view showing two operating states of the tension bar of the tape recorder of FIG. 3.

The operating pin 28a is guided along the cam slot 11d which is provided at the other end of the main slide device 11 as a consequence of the movement of the main slide device 11 as shown in FIGS. 4(A), 4(B) and 7. This causes tension pole 28 to pivot about the shaft 31 as indicated by arrow c to partially take up the released tape. At the same time, the latch lug 11e which is integrally adjacent to one edge of the guide hole 11b of the main slide device 11, moves in the direction of arrow b as shown in FIGS. 5(A) and 5(B). This allows the operating lever 14, which is in close contact with the latch lug 11e by means of the tension force of the resilient member 13 at its other end, to rotate about its shaft 15 as indicated by arrow d. The tooth-shaped projection 14a provided on the end of the operating lever 14 meshes with one side of the driving gear 16 to rotate the driving gear 16 through a predetermined angle.

When the driving gear 16 is rotated through predetermined angle by its engagement with the tooth-shaped projection 14a of the operating lever 14, as indicated by arrow in FIG. 5(A), the helical release spring 19 is rotated so as to be wound more tightly causing its inner surfaces to move into closer contact with the outer cylindrical surface of the boss 16a and to generate torque, or frictional braking action, therebetween.

Therefore, the rotational force of the driving gear 16 is transmitted to the transmission gear 17 which is engaged with the release spring 19 at one end thereof. The supply reel disk 12 of which gear portion 12b meshes with the transmission gear 17 is rotated through a predetermined angle, until the operating lever 14 is stopped by abutting against the abutment projection 12c which is provided as an integral projection of the boss 12a; the supply real disk is not rotated any further, as shown in FIG. 5(B).

Accordingly, the remainder of the released tape is removed onto the supply reel by rotating the supply reel disk 12 through the predetermined angle. Therefore, the tape sag which would be caused by releasing the tape from the supply reel disk 12 can be prevented.

When the transport direction of the tape is changed back from the reverse direction for forward, the main slide device 11, which operates under the power of the loading motor via the master cam 20 and the brake lever 21, moves to the right as shown by arrow f in FIG. 5(B). The latch lug 11e provided on the main slide device 11 pushes the operating lever 14 so that the lever 14 is rotated as indicated by arrow g. Accordingly, the tooth-shaped projection 14a of the operating lever 14 is operated so that the driving gear 16 is rotated as indicated by arrow h.

The driving gear 16 is simultaneously rotated in the direction so as to uncoil the release spring 19 mounted on the boss 16a. The inner diameter of the release spring 19 is therefore increased and the radial gap is increased between the inner diameter of the release spring 19 and the outer diameter of the boss 16a of the driving gear 16 to allow free idling, rotation by sliding therebetween. As the result, the rewind torque disappears so that the turning force of the driving gear 16 is not transmitted to the transmission gear 17.

Consequently, the supply reel disk 12 is not rotated and the tension of the tape can be maintained only by the withdrawal to the original position of the tension bar 28 which occurs when the guide pin 21a is guided along the cam slot 11d by the movement of the main slide device 11.

As described above, using the tape sag preventing apparatus embodying this invention, the tape sag phenomenon, which occurs when the transport direction of the tape is changed from the forward direction to the reverse direction, can be prevented by rotating the reel disk in the rewind direction through the predetermined angle with the operating lever interlocking with the main slide device and the rotation transmitting means being rotated in only one direction. As a result, the tension of the tape may be maintained continuously, thereby noise due to the failure of the tape to contact the drum head is avoided and the function of the product incorporating the tape mechanism is improved considerably.

The invention is in no way limited to the embodiment described hereinabove. Various modifications of disclosed embodiment as well as other embodiments of the invention will become apparent to persons skilled in the art upon reference to the descriptive of the invention. It is therefore contemplated that the appended claims will cover any such modifications or embodiments as fall within the true scope of the invention.

What is claimed is:

1. An apparatus for preventing tape sag in a tape recorder having a master cam driven by a loading motor, and an idler gear for selectively engaging a supply reel disk driven by a capstan motro and a take-up reel disk to be driven by said capstan motor, said apparatus comprising:

a main slide device interlocking with a brake lever and movable by the master cam for driving brakes to brake rotation of the supply reel disk; and means for preventing loss of tape tension during a change in a transporting direction of the tape according to movement of said main slide device, said preventing means comprising:

an operating lever pivoting according to the movement of said main slide device during said change in a transporting direction;

a driving gear subjected to rotation in a forward and in a reverse direction by said pivoting of the operating lever;

a transmission gear meshed with said supply reel disk; and coupling means for transmitting torque between said driving gear and said transmission gear in response to said rotation of said driving gear by said pivoting.

2. An apparatus as claimed in claim 1, wherein said main slide device is provided with a cam slot formed on one end thereof to drive a tension pole for maintaining tape tension.

3. An apparatus as claimed in claim 1, wherein said: driving gear comprises a boss and a fixed shaft, and said coupling means comprises a release spring having an inner end, said release spring being inserted between the driving gear and the transmission gear, wherein the driving gear and the transmission gear are coaxially mounted on said fixed shaft with the torque being transmitted from the driving gear to the transmission gear according to compression between the inner end of the release spring and the boss of the driving gear.

4. A tape recorder, comprising:

a master cam;

reel disks mounted in said tape recorder for suporting a length of a tape, said tape being wound around said reel disks;

braking means movable by said master cam, for retarding rotation of one of said reel disks;

a main slide, interlocking with said braking means, being translated by said master cam; and tape sag preventing means for preventing sagging of said tape during a change in direction of travel of the tape in response to movement of said main slide, said tape sag preventing means comprising:

a rotatable operating lever and resilient means mounted on one end of said operating lever for biasing said operating lever, driving means rotating in a forward and in a reverse direction under influence of said operating lever, a transmission gear meshed with said one of said reel disks, and coupling means for transmitting rotational force between said driving means and said transmission gear.

5. An apparatus as claimed in claim 4, further comprised of said main slide containing a slot formed in one end thereof, and a tension member, engaging said slot, for maintaining tension in said tape disposed between said reel disks.

6. The apparatus of claim 5, wherein said coupling means comprises a release spring inserted between said driving means and said transmission gear, a shaft, said driving means and transmission gear being coaxially mounted upon a shaft with the rotational force being transmitted from the driving means to the transmission gear according to compression and relaxation of said release spring.

7. The apparatus of claim 4, wherein said coupling means comprises:

a release spring inserted between said driving means and said transmission gear, and a shaft, said driving means and transmission gear being coaxially mounted upon said shaft with the rotational force transmitted from the drving means to the transmission gear according to compression and relaxation of said release spring.

8. A video tape recording device, comprising:

a master cam;

reel disks for transporting a tape;

a capstan motor for driving said reel disks;

a brake lever for braking one of said reel disks;

a main slide device driven by said master cam, for urging said brake lever against said one of said reel disks;

sag preventing means for preventing loss of tape tension during a change in a transport direction of said tape, said sag preventing means comprising an operating lever pivoting according to the movement of said main slide device during said change, driving means rotating in a forward and in a reverse direction in response to said pivoting of said operating lever, a transmission gear meshed with one of said reel disks, and coupling means for transmitting torque between said driving means and said transmission gear.

9. A video tape recording device as claimed in claim 8, wherein said coupling means comprises;

a release spring inserted between said driving means and said transmission gear, and a shaft said driving means and transmission gear being coaxially mounted upon said shaft with the torque being transmitted from the driving means to the transmission gear according to said release spring.

10. A video tape recording device as claimed in claim 9, wherein said torque from said driving means is transmitted to the transmission gear according to compression of said release spring.

11. A video tape recording device as claimed in claim 8, further comprising an idle gear, pivoting between said reel disks according to said main slide device, for transmitting power from said capstan motor selectively to one of said reel disks.

12. A video tape recording device as claimed in claim 8, wherein said sag preventing means further comprises an elastic member for biasing said operating lever.

13. A video tape recording device as claimed in claim 8, further comprising: a tension pole for maintaining tape tension during said change in said transport direction of said tape by increasing a length of a tape path, wherein said main slide device is provided with a cam slot engaged by said tension pole.

* * * * *

UNITED STATES PATENT AND TRADEMARK OFFICE
CERTIFICATE OF CORRECTION

PATENT NO. : 5,195,697
DATED : 23 March 1993
INVENTOR(S) : Yoshiaki Ikeda It is certified that error appears in the above-identified patent and that said Letters Patent is hereby corrected as shown below:

Column 1,

Line 8,     change "sage" to --sag--;

Line 31,     change "tape 13" to --tape 4--;

Column 2,

Line 6,     change "form" to --from--;

Line 63,     change "member 9" to --member 29--;

Column 4,

Line 17,     change "for" to --to--;

Line 61,     change "descriptive" to --description--;

UNITED STATES PATENT AND TRADEMARK OFFICE
CERTIFICATE OF CORRECTION

PATENT NO. : 5,195,697
DATED : 23 March 1993
INVENTOR(S) : Yoshiaki Ikeda It is certified that error appears in the above-identified patent and that said Letters Patent is hereby corrected as shown below:

Column 5,

Line 1,    change "motro" to --motor--;

Column 6,

Line 4,    after "transmission gear, ", insert --and--;

Line 18,    after "force," insert --being--.

Signed and Sealed this

Twentieth Day of September, 1994

Attest:

BRUCE LEHMAN

*Attesting Officer*    *Commissioner of Patents and Trademarks*